UNITED STATES PATENT OFFICE.

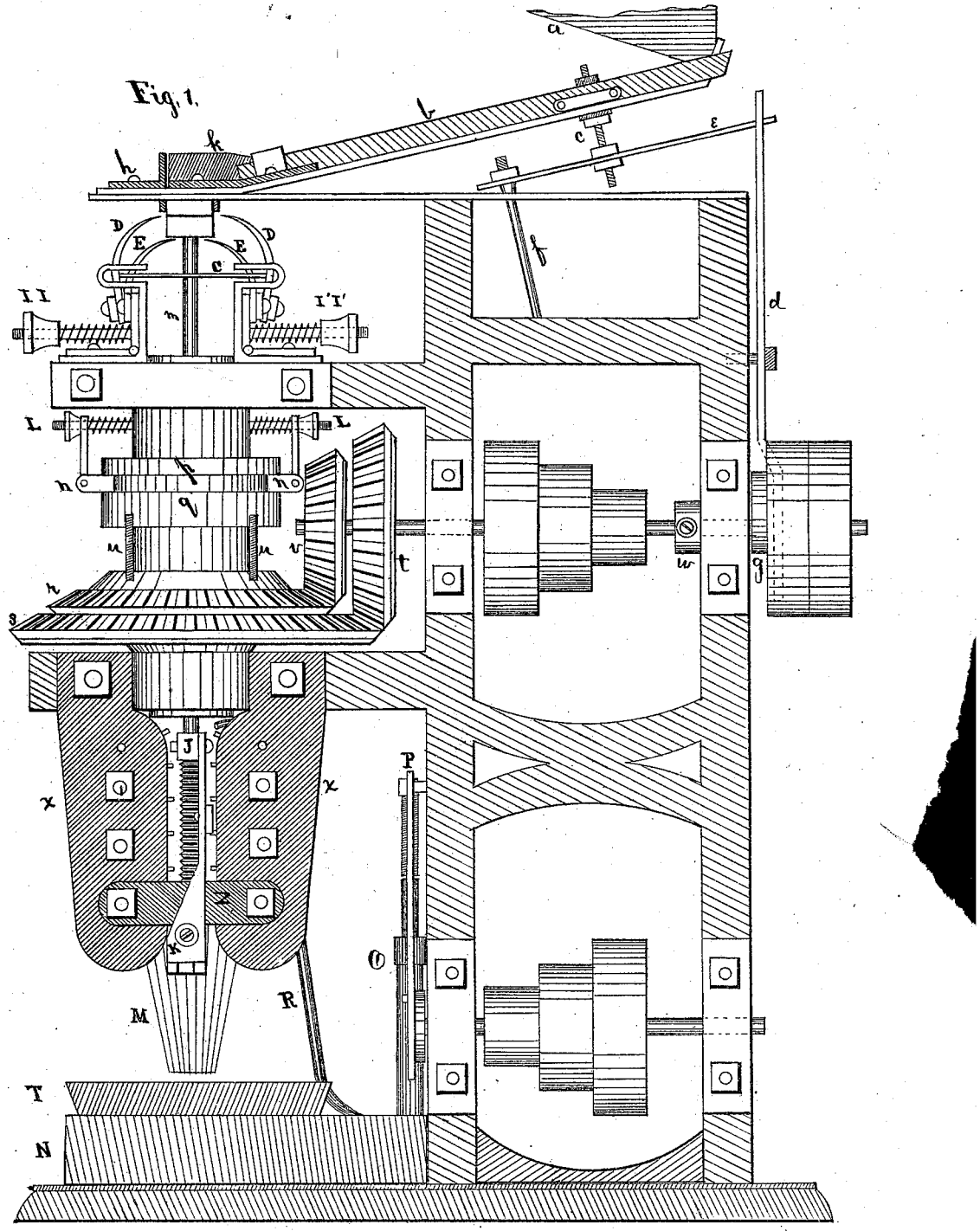

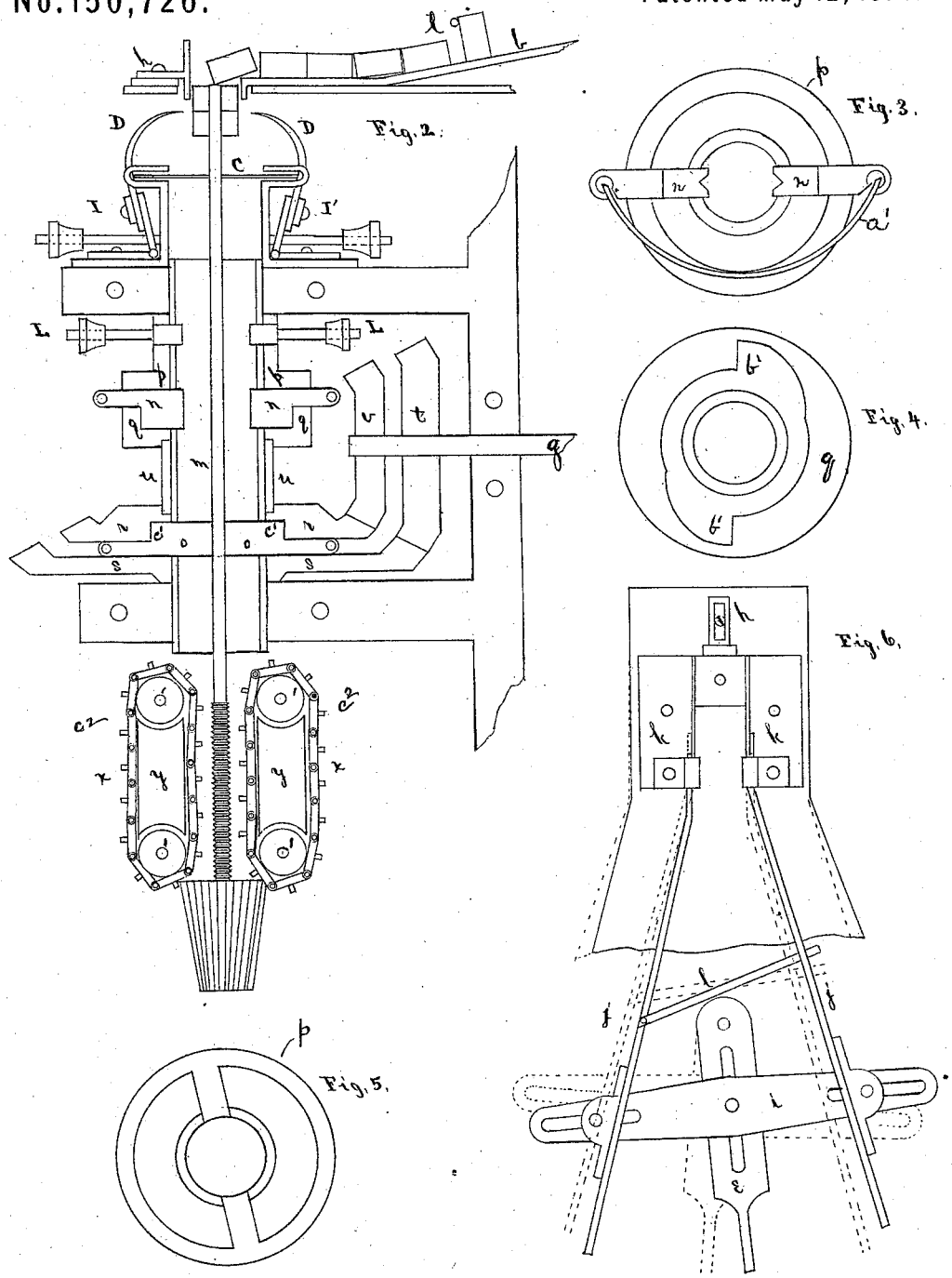

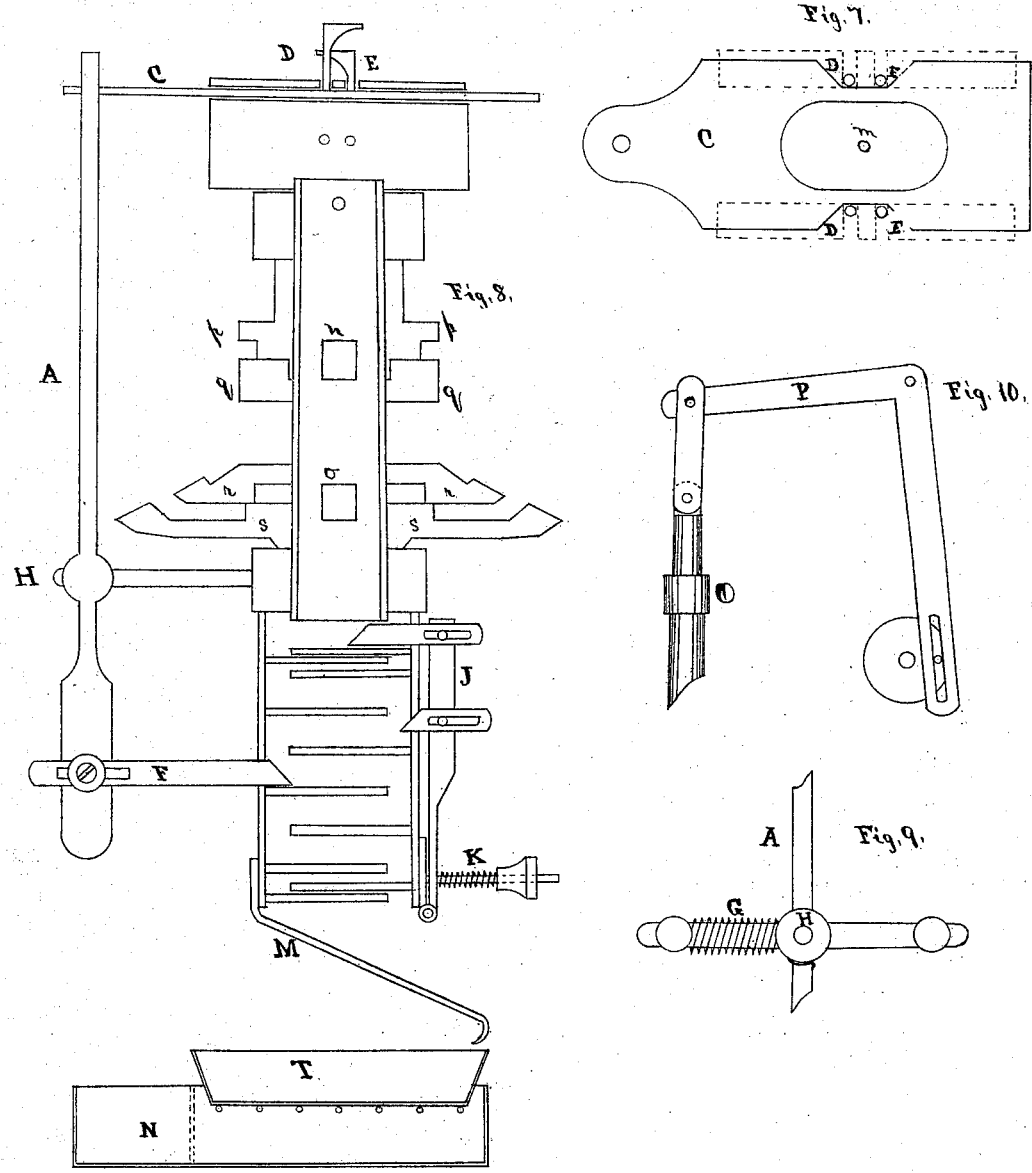

LEVI W. STOCKWELL, OF RAVENNA, OHIO.

IMPROVEMENT IN MACHINES FOR THREADING METALLIC NUTS.

Specification forming part of Letters Patent No. 150,726, dated May 12, 1874; application filed November 28, 1870.

*To all whom it may concern:*

Be it known that I, LEVI W. STOCKWELL, of Ravenna, in the county of Portage and State of Ohio, have invented a new and Improved Machine for Cutting the Threads of Metallic Nuts; and I do hereby declare that the following is a full, clear, concise, and exact description of the construction and operation of the same, such as will enable those skilled in the art to make and use the same, reference being had to the accompanying drawings and to the letters and figures of reference marked thereon, making a part of this specification.

The principle of this machine and its main features of novelty are, first, that the nuts may be poured promiscuously into a hopper, from which they pass onto a shoe whose sides have a peculiar motion, different from the motion of the bottom of the shoe, which carries the nuts onto the upper end of the tap, over which they pass, and drop from the other end of it; second, the tap is so constructed that at different places upon it its circumference is not a circle, but is made so that the tap may be held at these places alternately and the nuts pass over each of these places while the tap is being held and turned at another, and thus the thread of nuts is being constantly cut; third, the tap is held at each of these places by two half-clutches opposite to each other, so that their ends will clutch and hold the tap between them; fourth, each set of half-clutches is between two wheels placed against each other on a hollow shaft inclosing the tap, on which shaft one is fast and the other loose, and having a differential motion, so that a cam in one wheel moves the half-clutches through a groove in the other, causing them to open and close against the tap, while constantly revolving uniformly with the tap; fifth, below the clutches, and on opposite sides of the tap where the nuts are cut, are two adjustable endless chains, which hold the nuts from turning, having projections upon them, against which the nuts press while being cut, thereby moving the chains and pressing the following nut on the thread of the tap exactly as fast as the thread is being cut; sixth, the dropping of the nuts from the top of the tap is regulated by guards operated by means of a cam-slide, springs, and lever, by the projections on the endless chains, causing a nut to drop on the tap as often as one is cut; seventh, the straining of the oil from the cuttings and forcing it up on the tap by means of the force-pump.

Plate I, Figure 1, represents a front elevation of the machine. Plate II, Fig. 2, is a sectional view of a part of Plate I. Plate III, Fig. 8, is a vertical transverse section of a part of Plate I.

Like letters of reference apply to the same thing in different views.

The hopper $a$ is made of sheet-iron or other suitable material, and is suspended above the shoe $b$. There is an opening in the bottom of hopper $a$ large enough to permit the nuts to pass through. The shoe $b$ is just beneath this opening, so that the nuts in the hopper can always fall upon the shoe near its upper end. The lower end of the shoe is supported by the frame of the machine at the pin $h$, Fig. 1, which passes through the shoe into the frame. The upper end of the shoe is supported by the cross-bar $i$, in the center of which is a pin that projects into a slot in the bottom of and lengthwise of the shoe, at equal distances from each side. The cross-bar $i$ is fastened firmly to the upper end of the screw $c$, which passes through a slot in lever $e$. The cross-bar $i$ beneath the shoe extends across it so that both ends project beyond the sides of the shoe, and it is held at right angles to the lever $e$ by two nuts on the screw $c$, one above and the other under the lever $e$. These nuts are also used to adjust the slope of the shoe by raising or lowering the screw $c$. The bottom of the shoe is represented as broken off in Fig. 6. The sides $jj$, Fig. 6, are used to keep the nuts between them and aid in moving the nuts down the shoe to the tap. They may be made of wood or metal, and should be sufficiently high to keep the nuts between them. They rest on the shoe, extending from the top of the shoe nearly to the lower end, converging toward the lower end of the shoe till they are of the width of a nut apart. There is a slot near each end of the cross-bar $i$, through which a pin passes into a hole in the side $j$. This pin has a shoulder, which rests on the cross-bar $l$ and beneath the cross-bar $i$. The pin is threaded so that it can be fastened in the slot by a nut. The sides $jj$ are adjusted toward or from each other by moving these pins in the slots of the cross-bar $i$. The sides $jj$ are held in place at their lower ends by the slides $kk$, but so as to permit the sides to slide up and down on the shoe. Each slide $kk$ has a slotted flange, through which it is fastened by a screw to the shoe. By means of this slot and screw each slide $kk$, and also the sides $jj$, are adjustable to the size of the nut to be threaded. Near the lower end of the shoe there is a hole through it directly over the tap $m$, for the nuts to pass through and onto the end of the tap, which is on a level with the bottom of the shoe. The slides $kk$ extend through this hole on two opposite sides of the tap, to guide the nuts onto the tap, and to keep the nuts from turning with the tap. The stop at the pin $h$ is used to stop the nuts and guide them onto the tap. It has a slotted flange, through which it is fastened to the shoe by a screw and adjusted to different-sized nuts.

The cross-piece $l$ passes loosely through holes in the sides $jj$, and almost as near to the bottom of the shoe as the thickness of the nut to be threaded, for the purpose of preventing nuts from passing down the shoe, except flatwise. The cross-piece $l$ may be made of wire. One end of lever $e$ is fastened firmly to the pin or pivot $f$, which turns in the frame of the machine, and is placed at equal distances from each side of the shoe. The outer end of lever $e$ passes through a perpendicular slot in the upper end of lever $d$. The lower end of lever $d$ is open, having two parallel arms, between which there is an eccentric, the space between the arms being equal to the diameter of the eccentric. The eccentric is on the main shaft, on the inside of the driving-pulley. The lever $d$ has a fulcrum-pin passing through it into the frame of the machine.

The mode of operating the shoe is as follows: The eccentric revolves with the main shaft by means of a belt on the driving-pulley, and gives a vibrating motion to each end of lever $d$. The extent of this motion given to the upper end of lever $d$ is regulated by raising or lowering the fulcrum-pin in lever $d$. The upper end of lever $d$ gives a vibrating motion to the outer end of lever $e$, which gives a vibrating motion to the upper end of the shoe by means of the center pin in cross-bar $i$ projecting into the bottom of the shoe, and also, by means of the pins near the ends of cross-bar $i$, gives a peculiar motion to the sides $jj$. The lower end of the shoe turns on the pin $h$. The motion given by the lever $d$ to the different parts of the shoe is shown by the dotted lines in Fig. 6. The difference in the motion of the sides and of the bottom of the shoe is caused by the difference in the relative distances of the cross-bar $i$ from the pin $f$ and from the pin $h$, and may be changed by moving the screw $c$ in the slot of lever $e$ nearer to or farther from the pin $f$. The motion of the shoe causes the nuts in the hopper which rest against the shoe to slide down the shoe, under the cross-piece $l$, to the hole in the shoe over the tap, where the sides $jj$ are near to each other, so as to permit but a single nut to pass at a time.

The tap $m$, Fig. 2, is constructed with two indentations on it, one between the half-clutches $nn$, and the other between the half-clutches $oo$, where its circumference is not a circle, so that, while cutting the thread of nuts, it may be held or clamped there, and turned by each set of half-clutches alternately, the inner ends of the half-clutches being made to fit the tap at the place where they hold it. The tap $m$ above its thread is in the center of a hollow shaft, which turns in boxes at each end in the frame of the machine. The wheels $p$ and $s$ are keyed on the hollow shaft. The wheels $q$ and $r$ are loose on the hollow shaft, and are keyed to each other by the two keys $uu$ across them. The wheel $p$, Figs. 1, 3, and 5, has a shoulder around it on the lower side, and there is a groove as deep as the shoulder across the wheel at its center. In this groove two half-clutches are placed, as shown in Fig. 3. Each half-clutch is made of a straight piece of iron or steel, shouldered on one side near the center, Fig. 2, the thickness of the outer part of the half-clutch being equal to the depth of the groove in the groove-wheel, and thinner than the inner part by the depth of the shoulder of the half-clutch, against which the cam-wheel presses. The wheel $q$ has two cams, $b'$, in the upper side, and opposite each other, as shown in Fig. 4, and is held up against the wheel $p$ by the keys $uu$, so that the shoulders of the half-clutches $nn$, Fig. 2, may come in contact with the cams and the inside shoulders of the wheel $q$. There are holes in the hollow shaft for the half-clutches to pass through. The outer ends of the half-clutches, Fig. 3, project beyond the shoulder of the wheel, and are connected by a spring, $a'$, passing half-way around the shoulder of the wheel, to press the half-clutches outward against the cams. The half-clutches $nn$, Fig. 2, are represented as pressed away from the tap by their connecting-springs, and with their shoulders held against the cams. The half-clutches between the wheels $r$ and $s$, Fig. 2, are represented as holding the tap, and their shoulders $c^1$ are pressed against the inside shoulders in wheel $r$ between the cams, each of which inside shoulders is in form an arc of a circle, whose center is the center of wheel $r$, and each shoulder being slightly more than one-fourth the circumference of the circle, Fig. 4. The cams and shoulders in wheel $r$ are the same as in wheel $q$, but the two cam-wheels are keyed to each other in such a position that a line drawn across one wheel will be at right angles to a line in the same relative position across the other cam-wheel. The two sets of half-clutches $nn$ and $oo$ are in line, one directly over the other, as shown in Fig. 8. The groove in wheel $s$, in which the half-clutches slide, is the same as in wheel $p$, and the half-clutches and their springs are the same in both wheels.

The wheels $r$ and $q$ are turned by the wheel $v$ on the main shaft. The groove-wheels $s$ and $p$, which are keyed fast to the hollow shaft, are turned by the wheel $t$ on the main shaft. The ratio between the number of teeth in wheel $t$ and the number of teeth in wheel $s$ differs from the ratio between the number of teeth in wheel $v$ and the number of teeth in wheel $r$; consequently, when the power is applied to the driving-pulley, and the main shaft $g$ revolves with the wheels $t$ and $v$, the number of revolutions per minute made by the groove-wheels $s$ and $p$ will differ from the number made by the cam-wheels $r$ and $q$. By this difference of speed between the groove-wheels and the cam-wheels, the half-clutches are operated by the cams—the upper and lower sets of half-clutches being opened by the springs and closed gradually against the tap by the cams alternately. Every time one set of wheels gains a half-revolution on the other set, the half-clutches open and close against the tap, and permit a nut to pass down the tap to the place where it is to be threaded. The cams are so made as not to permit either set of half-clutches to open until the other set has closed against the tap. By drawing out the keys $u\ u$, which slide in grooves across the top of wheel $r$ and the bottom of wheel $q$, and letting the cam-wheels come together, and by loosening a set-screw, so that the collar through which it passes can slip on the shaft, and moving back the shaft $g$ until the wheel $v$ is away from wheel $r$, the cam-wheels and groove-wheels may be separated, so that the half-clutches may be removed and changed for others to fit different-sized taps, and so that the tap may be removed and sharpened and replaced. The half-clutches are notched near their outer ends, to hold the ends of the springs which connect them, Fig. 3. The endless chains $x\ x$, Fig. 2, are made of narrow hinges, so as to be flexible and permit them to turn on the rollers 1 at the ends of each chain. There are small projections, $c^1$, on the outside of each chain, as shown in Figs. 1 and 2. The shafts of the rollers turn in the frame that supports the chain, Fig. 1. Each chain is supported between the rollers by the block or piece $y$, through which the sides or frame that supports the chain are firmly bolted. The sides are slotted near the top, through which they are bolted to the frame of the machine for support, and so as to be adjustable toward or from each other.

The chains are operated as follows: When there is no nut on the thread of the tap, a nut will be pressed on the thread as follows: The nut passes between the endless chains, and is kept by them from turning. The turning of the tap carries the nut down, which presses down on one of the projections, $c^1$, on each chain, and turns said chains. The projections of the chains will then press the following nut on the thread of the tap until the thread in the nut is partially formed, when the turning of the tap will carry the nut down, as before, and keep the chains turning. By reason of the nuts on the thread of the tap turning the chains to press the following nuts on the thread of the tap, each nut has a uniform motion with another, and always exactly proportionate to the size of the thread and the speed of the tap. A perfect thread is thus formed with less wear and breaking of the taps than would be caused by a disproportionate or irregular pressure on the nut. The endless chains are made adjustable to hold different-sized nuts by means of the slotted cross-brace, $z$, bolted to the frame or sides of the chains, and by means of the slots in the top of the sides, where they are bolted to the frame of the machine. The guards D D E E are used to hold up the nuts when they pass onto the tap from the shoe, and to drop them separately and at regular intervals. The top of the slide holder or frame in which the slide C moves is represented by the dotted lines in Fig. 7. The end of the slide-holder is represented in Fig. 1, and is in two parts on opposite sides of the tap, far enough apart to permit the nuts to drop between them. Each part at the bottom has a flange, through which it is bolted to the frame of the machine. Two hinges, side by side, are fastened on the top of each flange by a screw in each passing through a slot in the hinge into the flange. The other half of each hinge is pressed toward the outside of the upright part of the slide-holder by a spiral spring, I I I' I', Figs. 1 and 2. The guards D D E E are fastened against the outside of the upright parts of these hinges by a screw, so as to be adjustable to hold different-sized nuts. Each guard extends above the hinge through a slot in the slide-holder. The slide C may be made of sheet-iron or other suitable material; its shape is represented in Fig. 7; and it has a hole through it for the tap and nuts to pass through. In each side of the slide C is cut two inclines, diverging outward. In Fig. 7 end sections of the guards D D E E are shown near the inclines. When the slide C is moved to the left the guards E E will be opened or pressed outward by the right-hand incline. Now, if slide C be moved back to the right the guards will be pressed by the spiral springs near the inclines, as shown; if moved farther to the right the guards D D will be opened or pressed outward to permit the nuts above them to fall, while the guards E E remain closed to catch and hold the nuts, as shown in Fig. 1. Now, by moving the slide to the left again the guards D D will be closed against or under the nut next to the one resting on guards E E, which will then open and permit the nut resting on them to drop on the tap, while the guards D D hold the nuts above. Thus one nut is dropped by the guards each time that slide C is moved to the right and back again to the left. The slide C is operated by lever A, Figs. 8 and 9, the upper end of which passes through a hole through the slide C near one end. The fulcrum of lever A is at H, where the lever passes through the rock-shaft G, Fig. 9, which turns at each end in supports fastened to the frame of the machine. A spiral spring attached to the rock-shaft presses the upper arm of lever A outward, and moves slide C to the left. The lever A is adjusted up and down, and held by a set-screw at H. F is attached to lever A, and has a slot through it near the outer end, through which it is bolted firmly to said lever at right angles. The other end of the part F is beveled to a point at the bottom, and projects between the endless chains, so that when the nuts turn the chains the ends of the projections on one of the chains will successively come in contact with the beveled end of F, and force it away from the chains, thereby moving the upper end of lever A inward. When the projection on the chain has passed from contact with F the pressure of the spiral spring on the rock-shaft G will carry the end of part F between the projections again, and carry the upper end of lever A outward. On one of the chains every alternate projection is shorter than the others, as shown in Fig. 8, so that lever A may be operated, if desired, less frequently. The lever A may be operated by either of the endless chains. The guard J, Figs. 1 and 8, is used to drop the nuts separately between the chains, and to turn each nut so that a side of the nut will be parallel with the face of the chains. It is hinged at the lower end, the hinge being firmly attached to the cross-brace $z$. Between the upper end of the guard and the hinge is a part of the guard similar to the part F of lever A, and attached adjustably in the same manner as the part F, and also operated in the same manner by the projections on the chain. It is also adjustable up and down by means of a perpendicular slot in the guard. The guard is pressed toward the tap by a spiral spring in the same manner that the guards D D E E are pressed toward the tap. The upper part of the guard projects between the chains, and is adjustably attached to the upright part of the guard by a bolt or screw. The end of the upper part of the guard which turns and drops the nuts is in shape and position like the side of a pyramid, except that the face is narrow and rounded near the top, so that when a projection on the chain forces the guard away from the tap, a nut resting on the top of the guard will be turned in, passing the end of the guard till the side of the nut is parallel with the faces of the chains. The upper end of the guard should be so adjusted as to be near enough to the tap to catch and hold each nut that drops on the tap. The outer ends of guards L L, Fig. 2, pass through supports attached to the outer ends of the half-clutches $n\ n$. The inner ends of guards L L are supported in and project through holes in the hollow shaft. There is a spiral spring around each guard, which presses it in toward the tap a little farther than the inner ends of the half-clutches $n\ n$. These guards are used to prevent falling nuts from being caught between the upper half-clutches when they are closing.

When the half-clutches are closing, the guards come in contact with the tap, and are pressed back against their spiral springs. The leader M, Fig. 1, is made of wires attached in a row near enough to each other to prevent a nut from passing between them. At the upper end it is attached to the frame of the chains near the bottom, and on one side of the chains. The row of wires forming the leader is bent, as shown in Fig. 8, to catch the nuts as they fall from the tap, and lead them off to one side of the oil-vessel N, and to lead the oil and cuttings into the pan T. The pan T is perforated with holes in the bottom and sides, to permit the oil to drain through into vessel N, while the cuttings are retained. It rests on wire or other supports across vessel N, at or near the top. Vessel N is intersected by sieves, through which the oil is strained, and afterward is pumped through a tube onto the thread of the tap, and so used continuously and repeatedly to oil the tap and nuts while cutting the threads. The pump O, Fig. 1, stands in the oil-vessel N. It is attached to the frame of the machine and is operated through the lever P, Fig. 10, which has a slot in one end, through which it is operated by a crank or pin in a wheel on the end of the shaft, driven by belt and pulley from the main shaft of the machine. The endless chains must be long enough to run parallel with each other a greater distance than the threaded part of the tap, so that the projections can press the nuts onto the thread of the tap, and so that the nuts will be kept from turning until they drop from the tap. The step-pulley on the shaft $g$ is connected by a belt with a pulley on a lower shaft.

The main parts of the machine are operated as follows: Power is applied to the belt on the driving-pulley at the end of shaft $g$. This turns the main shaft and a lower shaft, thereby operating the oil-pump O through the lever P, so that a stream of oil is poured on the thread of the tap through the tube of the pump, the upper end of which is near to and points directly toward the tap. The revolving of the eccentric on the inside of the driving-pulley operates the lever $d$, the lever $e$, the shoe $b$, with the sides $jj$, causing the nuts to slide from the hopper down the shoe and over the end of the tap onto the guards D D E E. The wheel $t$ turns the hollow shaft and the groove-wheels which carry the clutches, and the wheel $v$ turns the cam-wheels at a speed differing from the speed of the groove-wheels, thereby opening and closing each set of half-clutches alternately, so as to permit nuts to fall beneath them, while they constantly hold and turn the tap. The turning of the tap causes the nuts thereon, which are kept from turning by the endless chains, to move down on the thread of the tap and turn the chains by pressing on the projections $c^2$. The projections on the chains press the following nuts onto the thread of the tap. By the turning of the chains, each projection on one of the chains presses out the bottom of lever A, which forces the top of the lever and slide C to the right, thereby opening guards D D, and letting the nuts on the tap above fall on guards E E. When the projection has passed below lever A, the spiral spring on the rock-shaft G forces outward the top of lever A and the slide C to the left, thereby closing the guards D D under or against the second nut above guards E E to hold it with others above from falling, and then opening the guards E E and permitting the nut on them to fall. The nut falls from the half-clutches, when they open, onto guard J, just above the chains. The turning of the chains forces back guard J from the tap, so that the guard permits the nut to drop on the chains, at the same time turning the nut, if necessary, so that its side will be parallel with the faces of the chains.

I do not claim as my invention the ordinary tap, shaped to be held only in one place and at one end; but

I claim as my invention—

1. The combination of the shoe $b$, with its sides $j j$, the cross-bar $i$, and lever $e$, substantially as and for the purpose herein set forth.

2. The combination of the tap $m$, the shoe $b$, and hopper $a$, substantially as and for the purpose herein set forth.

3. The half-clutches $n n$ and $o o$, in combination with the tap $m$, substantially as and for the purpose herein set forth.

4. The combination of the cam-wheels $q r$, the groove-wheels $p s$, the hollow shaft, the tap $m$, and the half-clutches $n n o o$, with their connecting-springs, substantially as and for the purpose herein set forth.

5. The combination of the cam-wheel $r$, the groove-wheel $s$, the wheels $v$ and $t$, and the half-clutches $o o$, substantially as and for the purpose herein set forth.

6. The combination of the endless chains $x x$ and the tap $m$, substantially as and for the purpose herein set forth.

7. The combination of the endless chains $x x$, the lever A, the slide C, and the guards D D E E, substantially as and for the purpose herein set forth.

8. The combination of the guard J with the endless chains $x x$ and the tap $m$, substantially as and for the purpose herein set forth.

9. The combination of the guards L L with the half-clutches $n n$, substantially as and for the purpose herein set forth.

LEVI W. STOCKWELL.

Witnesses:
BRADFORD HOWLAND,
EDWARD FITCH.